United States Patent [19]
Dufour et al.

[11] Patent Number: 5,369,248
[45] Date of Patent: Nov. 29, 1994

[54] ELECTRO-WELDABLE CONNECTING PIECE HAVING CONNECTION TERMINALS AND ITS METHOD OF MANUFACTURE

[75] Inventors: Denis Dufour, Franconville; Martine Brunet, Groslay, both of France

[73] Assignee: Gaz de France, Paris, France

[21] Appl. No.: 113,827

[22] Filed: Aug. 31, 1993

[30] Foreign Application Priority Data

Sep. 1, 1992 [FR] France ................. 92 10450
Aug. 23, 1993 [EP] European Pat. Off. ......... 93 402085

[51] Int. Cl.$^5$ ............................................. H05B 3/58
[52] U.S. Cl. ................... 219/541; 156/304.2; 156/304.3; 285/21
[58] Field of Search .............. 219/150 V, 535, 541, 219/544; 156/158, 273.9, 274.2, 304.2, 304.3, 304.6; 285/21

[56] References Cited

U.S. PATENT DOCUMENTS

| | | | |
|---|---|---|---|
| 3,061,503 | 10/1962 | Gould et al. | 285/21 |
| 4,407,619 | 10/1983 | Siebol . | |
| 4,684,417 | 8/1987 | Grandclement | 156/304.6 |
| 4,727,242 | 2/1988 | Barfield | 285/21 |
| 4,855,574 | 8/1989 | Lodder et al. | 219/535 |
| 5,086,213 | 2/1992 | Nussbaum et al. | 156/274.2 |
| 5,141,580 | 8/1992 | Dufour et al. | 219/535 |
| 5,255,943 | 10/1993 | Keller et al. | 156/274.2 |
| 5,269,713 | 12/1993 | Brezovar et al. | 439/881 |

FOREIGN PATENT DOCUMENTS

| | | |
|---|---|---|
| 0010055 | 4/1980 | European Pat. Off. . |
| 0149410 | 7/1985 | European Pat. Off. . |
| 2519393 | 7/1983 | France . |
| 612489 | 7/1979 | Switzerland . |

Primary Examiner—Geoffrey S. Evans
Attorney, Agent, or Firm—Rothwell, Figg, Ernst & Kurz

[57] ABSTRACT

A connecting device for connecting two thermoplastic pipes together including a thermoplastic body having a resistive element having a wire mesh structure and connection terminals. Each of the connection terminals has a tubular rivet body made of an electrically conductive material. The tubular rivet body includes a collar integrally formed with a hollow shaft and a flanged portion bent to immobilize the resistive mesh after the connection terminals are riveted to the mesh. This increases the reliability of the connection terminals to the resistive mesh.

10 Claims, 3 Drawing Sheets

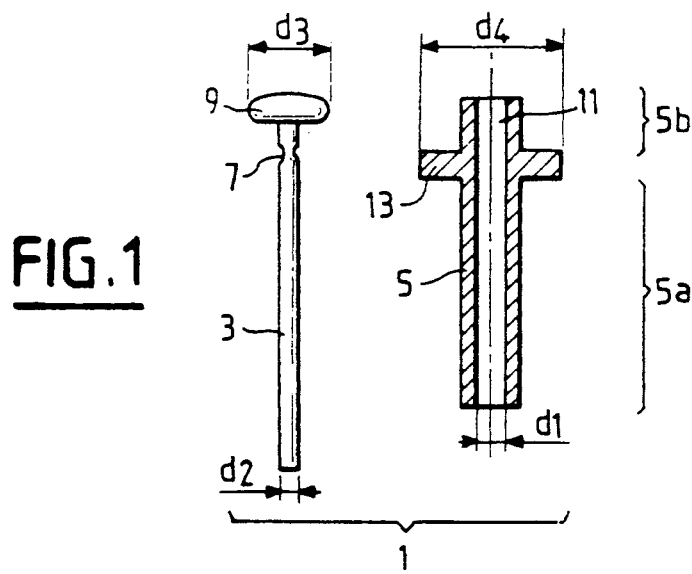
FIG. 1
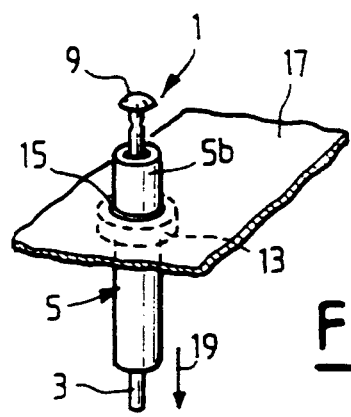
FIG. 2
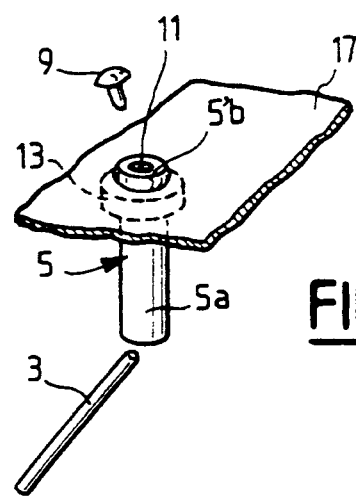
FIG. 3
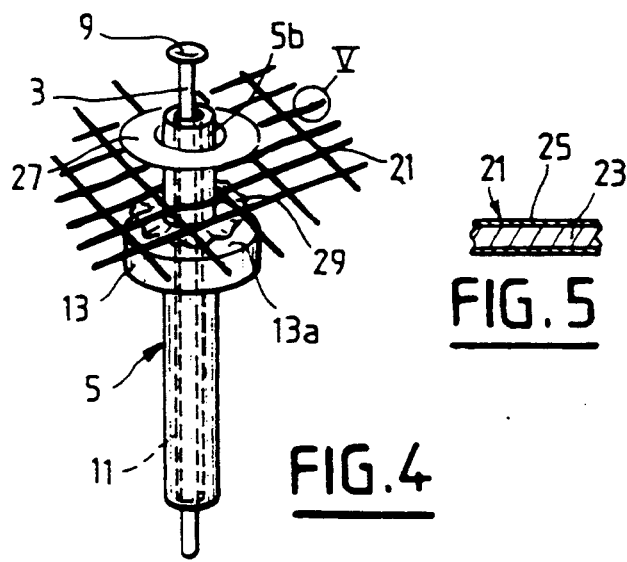
FIG. 4
FIG. 5
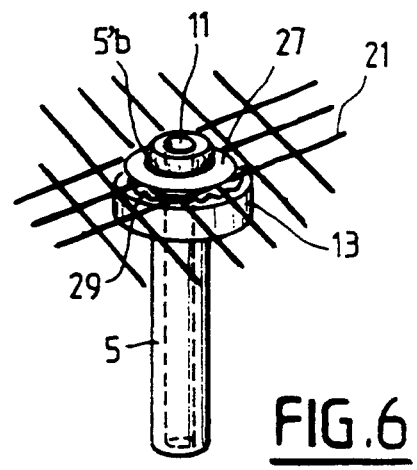
FIG. 6

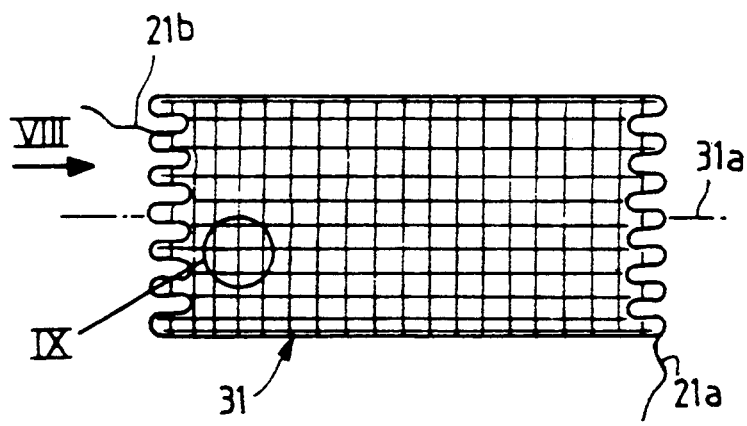
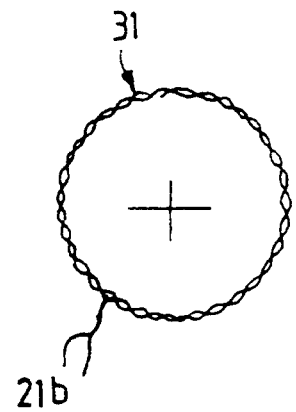
FIG.7     FIG.8
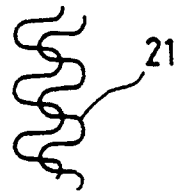
FIG.9
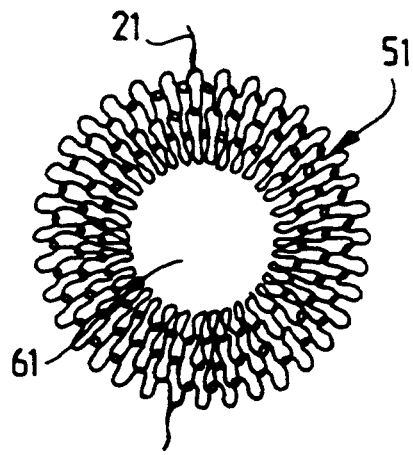
FIG.11

ELECTRO-WELDABLE CONNECTING PIECE HAVING CONNECTION TERMINALS AND ITS METHOD OF MANUFACTURE

BACKGROUND OF THE INVENTION

The invention relates to a plastic connecting piece (such as a sleeve or a T-connection saddle) intended for joining axially or transversely, and by heat-welding, two pipes, in particular in the gas industry, the invention relating more particularly to the improvement of the connection terminals of the electrically conducting resistance element with which said connecting device is equipped.

Such a device, which includes, for the heat-welded joining of two polyethylene pipes, an electrical heating resistance element consisting of a coiled electrically conducting wire embedded in the thickness of the piece in the vicinity of its internal welding surface, is already known from publications EP-A-0,149,410 or U.S. Pat. No. 4,684,417.

The welding operation is then carried out by placing opposite each other the pieces to be welded and by connecting the coiled electrical wire to an electrical source (such as a rectified source of alternating current) which, by the Joule effect, will heat up the resistance element and cause the softening until melting of the plastic surrounding the pieces, ensuring welding under pressure.

For the electrical connection of the resistance element, its two wire ends are usually each welded to a connection terminal each often emerging into a well or a cavity, so as to be able to constitute two pins which will be able to be plugged in, inside the said wells, to removable complementary sockets.

Still within the same field, other types of resistance elements can be used.

Thus, publication FR-A-2,654,978 provides the use of a single-wire net or of a grid which can be produced from a stretched metal plate.

However, the external electrical connection of this net or of this grid remains the same as the solution mentioned hereinabove. In the first case (single-wire net), the two ends of the wire are drawn out in order to be welded to the aforementioned pins. In the second case (stretched grid), it is advised to use two conducting plates fixed at two opposite ends of the grid, and two conducting joint cables welded on one side to the said plates and on the other side to the two aforementioned pins.

However, problems of reliability of the welded joints may then occur. There is also the risk that the fusion zone of the plastic body can end up damaging these joints, at the moment of the welding.

Furthermore, especially in the case of the use of a monofilar net, all this implies lengthy and tricky implementation operations.

Another solution is provided in Application EP-A-0,278,553. In this application, the connection terminals are applied to a connection piece in which a resistance element in the form of a coiled wire is embedded. These terminals each consist of two complementary pieces which are fitted into each other after having been inserted into the cavities provided for this purpose in the connecting piece. The two parts of the one same terminal, which are subjected to two opposed direction forces, are thus suitable for gripping a thin thickness of plastic where the resistance element passes and, once "clipped together", then establish an electrical contact with this resistance element. However, the use of such terminals necessitates producing tapped holes in the piece in order to insert therein the two complementary components of the terminals. On the other hand, the fitting of these components one into the other could lead (if the fitting forces are not very precisely applied), to a detrimental deformation of the connecting piece.

SUMMARY OF THE INVENTION

Taking this into account, the object of the invention is especially to provide a connecting piece whose connection terminals ensure a connection which is reliable and is carried out very rapidly by a simple operation, the electrical joint obtained with the resistance element being particularly firm mechanically, without appreciable risk of this resistance element tearing or of the piece becoming damaged.

Thus it has been imagined to have recourse to a riveted joint.

More precisely, the invention firstly provides a connecting piece which is characterized in that its connection terminals comprise at least one tubular blind-rivet body, made of electrically conducting material, acting as an electrical connector and including a shaft emerging at the surface of the body of the piece, this shaft being connected, at one end, to a collar against which is bent over, on the opposite side of the shaft, a flanged part immobilizing the resistance element of the piece, between it and the collar.

Of course, the use of rivets is known in mechanical engineering. It is also known, from EP-A-0,010,055, to use a rivet as an electric socket. In this application, a blind rivet is fixed to an electrically conducting solid metal sheet in order to establish an electrical contact with this metal sheet. This rivet is installed in a known manner by virtue of a pair of tongs exerting on a single side a traction force on the male component of the rivet, the female component being held pressed against the metal sheet.

However, EP-A-0,010,055 does not relate to the field of electro-welding.

This document therefore does not take into account the problems specific to electro-weldable thermoplastic pieces and especially the questions:

a)—of mechanical and thermal stresses which the resistance element and its joint have to withstand during the welding;

b)—of installation of the said terminals within the piece itself.

With regard to point a), nothing indicates that the riveted joint of EP-A-0,010,055 could be suitable for an electro-weldable device, the mole so as document EP-A-0,278,553 invites the use of two-piece electrical terminals, therefore certainly being able, at least slightly, to act one with respect to the other and with respect to the resistance element, if the mechanical stresses due to heating during the welding are too great. It will also be noted that the rivet of EP-A-0,010,055 is fixed to a solid plate, and is therefore relatively rigid, whereas the terminals of EP-A-0,278,553 are fixed to a coiled wire.

Furthermore, as regards point b), if, based on EP-A-0,278,553, it is sought to install, instead of terminals having fittable components, the rivet described in EP-A-0,010,055, by conventional application, from one side, of a force on its male component (the female component being pressed against the thin layer of plastic enclosing the resistance element), this would certainly run the risk of a disastrous deformation of this layer, or indeed of the wire resistance element.

Now, going precisely counter to the teaching that the person skilled in the art would be able to draw from EP-A-0,278,553 and EP-A-0,010,055, the invention precisely provides the use of a rivet (and more precisely of its female component) as an electrical connector for supplying the resistance element of a joint piece for the heat-welded joining especially of polyethylene pipes.

In practice, the female body of the rivet will ensure its connection function by means of its shaft which will be able to act as a pin. In addition, the connecting device, which is the subject of the present invention, will be able to constitute an electro-weldable sleeve for the substantially coaxial joining of two pipes by heat-welding. This piece will also be able to constitute an electro-weldable branch connector for the transverse joining of the pipes.

Advantageously, and as indicated above, the invention is most particularly applicable if the resistance is in the form of a monofilar meshed net, which is particularly sensitive to the stresses which can be induced during the welding.

Another problem which arises is therefore that of the electrical contact to be established with this particular type of resistance element under optimum conditions of effectiveness and in conjunction with the problems of mechanical stresses mentioned previously.

The solution provided here consists in associating with each rivet component engaged through a mesh of the resistance element, means for tearing the covering layer of the said wire at the location of the riveting of the terminal, thus ensuring the electrical contact, the said terminals furthermore being, with the resistance element, partly embedded, by moulding, in the body of the piece. In practice, and preferably, the adopted tearing means will extend around this mesh facing the flange of the terminal. For this purpose, and depending on the size of the meshes of the net, it will be possible in particular to use two washers for each rivet, gripping the net tightly between them, one of these washers (which can most particularly be of the "toothed" type).

Finally, taking into account the above, the invention also relates to a method of manufacturing a connecting piece of one of the aforementioned types, characterized in particular in that:

the connection terminals are crimped to the resistance element;

and onto these is overmoulded the body of the connecting piece, causing the shaft of each terminal to emerge into a well made on an external surface of the body of the piece and having a cross-section greater than that of the shaft.

It will be noted that such a manufacturing method has the advantage of being simple to implement, the reliability of the terminals/resistance-element electrical connection virtually preventing any risk of rupture of this connection, during the overmoulding especially. Furthermore, the fixing of the terminals to the resistance element before overmoulding the assembly makes it possible to avoid the possible risks of deformation of the piece which are connected, on installing the terminals on the already-formed body, with its resistance element.

Other characteristics and advantages of the invention will again appear from the more detailed description which follows, given with reference to the attached drawings which show, in a non-limiting fashion, embodiment and utilization examples of the invention.

BRIEF DESCRIPTION OF THE DRAWINGS

FIG. 1 shows, in exploded view, the two pieces which can form the basis of the electrical connection rivet of the invention:

FIG. 2 shows the installation of the rivet of FIG. 1 for the electrical connection of a conducting piece;

FIG. 3 shows the entire FIG. 2 once the rivet has been riveted;

FIG. 4 shows the rivet of FIG. 1, to which has been added two washers, the rivet being in this case arranged in the position ready to grip a net portion tightly;

FIG. 5 shows a possible embodiment detail of the wire constituting the net illustrated in FIG. 4, according to the detail V of this same figure;

FIG. 6 shows the entire FIG. 4 once the connection piece has been riveted;

FIG. 7 shows a possible conformation of monofilar net which can be used in particular on a heat-weldable connecting sleeve;

FIG. 8 is a view of the net of FIG. 7 in the direction of the arrow VIII of this same FIG. 7;

FIG. 9 shows an embodiment detail of the net, at the location of the reference IX of FIG. 7;

FIG. 11 represents another possible embodiment of such a net having the appearance of a ring or a crown;

DETAILED DESCRIPTION OF THE DRAWINGS

Figure 10:
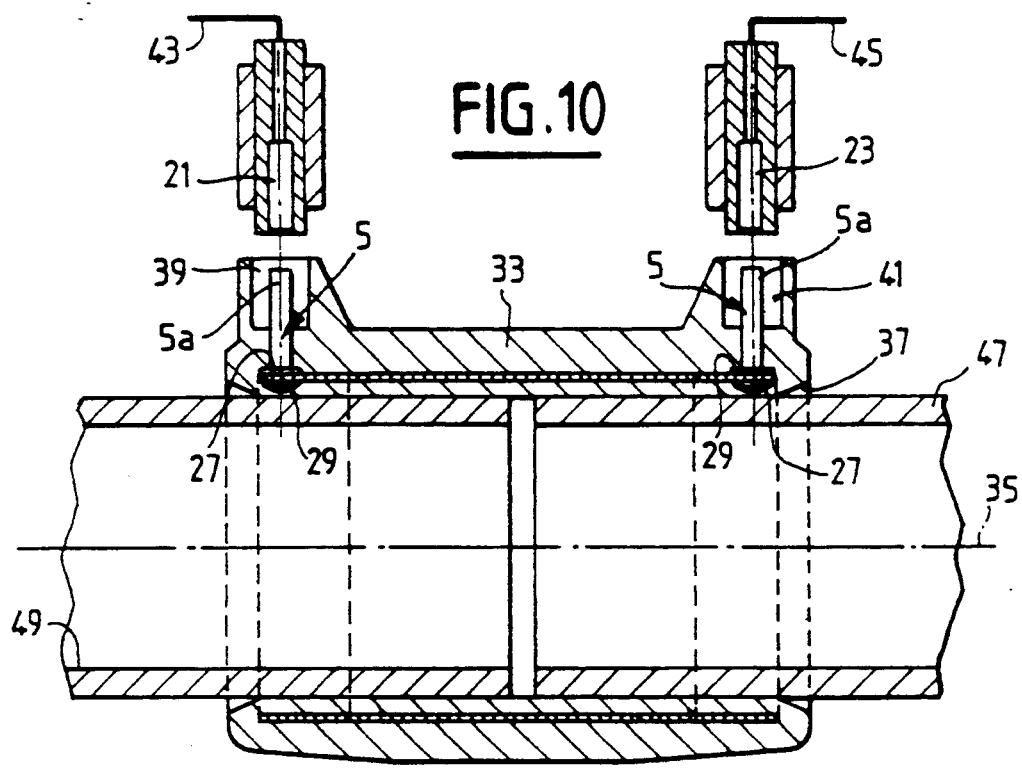
FIG. 10 represents, in central longitudinal section, an electro-weldable connecting sleeve equipped with the rivets/net assembly.

First of all, FIG. 1 shows an assembly piece of the "blind" rivet type which will therefore be used as an electrical connection terminal.

The device, identified in its entirety by 1, comprises an ejectable male rivet shank 3 and an elongated female body 5.

The shank 3 (also called a "stud") is said to be "ejectable" in that it breaks off at the location of a preformed rupture neck 7 and is separated from the body 5 once the latter has been riveted, the shank then being ejected from the riveting apparatus.

It will be noticed that this shank 3 has a widened part 9 forming the head at one end and near the neck 7.

Regarding the body 5, this is penetrated by an axial passage 11 of intermediate cross-section $d_1$ between the cross-section $d_2$ of the shank and that $d_3$ of the head 9 so that only the said shank 3 can be inserted therein.

In addition to this, the body 5 has, at an intermediate location along its axial length, an external normal collar 13 delimiting a lower tubular section $5a$ (the longer section) and an upper tubular section $5b$ (the shorter section), coaxial one with respect to the other.

Preferably, (and in fact conventionally), the two parts of the piece 1, shank and body, will be produced from metal, such as aluminium typically, being thus electrically conducting and relatively malleable under a force without rupturing.

By way of embodiment example, the stud 3 will be able to have a length of approximately 40 millimeters with a shank cross-section of the order of 1 millimeter and a head cross-section ($d_3$) of the order of 2 millimeters. As regards the tubular body 5, this will be able to have a length of approximately 25 millimeters with a cross-section of the lower section 5a of the order of 35 to 40 millimeters and a cross-section of the upper section 5b of the order of 25 to 30 millimeters, each section being able to have a length of approximately 15 and 8 millimeters, respectively.

FIG. 2 shows the piece 1 engaged in an orifice 15 made through an electrically conducting piece 17, such as a metal plate which is to be supplied with electric power via a connection terminal, a role which the piece 1 will play once the latter has been riveted to this plate.

In order to fix the piece 1, the diameter of the orifice 15 will be less than the diameter $d_4$ (see FIG. 1) of the collar 13 which has been placed just beneath the plate 17, the orifice 15 of which is only penetrated by the upper tubular section 5b.

The shank 3 has been installed through the body 5 in such a way that its head 9 emerges on the side of the upper section 5b.

Once the piece 1 has been thus arranged, it will suffice, in order to fix it, to use a conventional pair of riveting tongs available commercially, such as a pair of tongs of the "FACOM" trade mark (registered trade mark), model "GESIPA NT X".

Under the action of the jaws of this pair of tongs which will exert an axial traction force on the shank 3 in the direction of the arrow 19 of FIG. 2, the head 9 will exert a compressive force on the section 5b which, made from a thermoplastically deformable material, will be squashed from its free upper end in order to form a flange identified by 5'b in FIG. 3, the cross-section of this flange then being greater than the cross-section of the orifice 15, thus keeping, by means of this riveting operation, the plate 17 between the flange formed and the collar 13.

During this operation, and as indicated hereinabove, the stud 3 will break off at the location of its preformed rupture zone 7, the lower shank part being ejected from one side, the remainder of this shank and the head 9 being ejected from the other.

Figure 12:
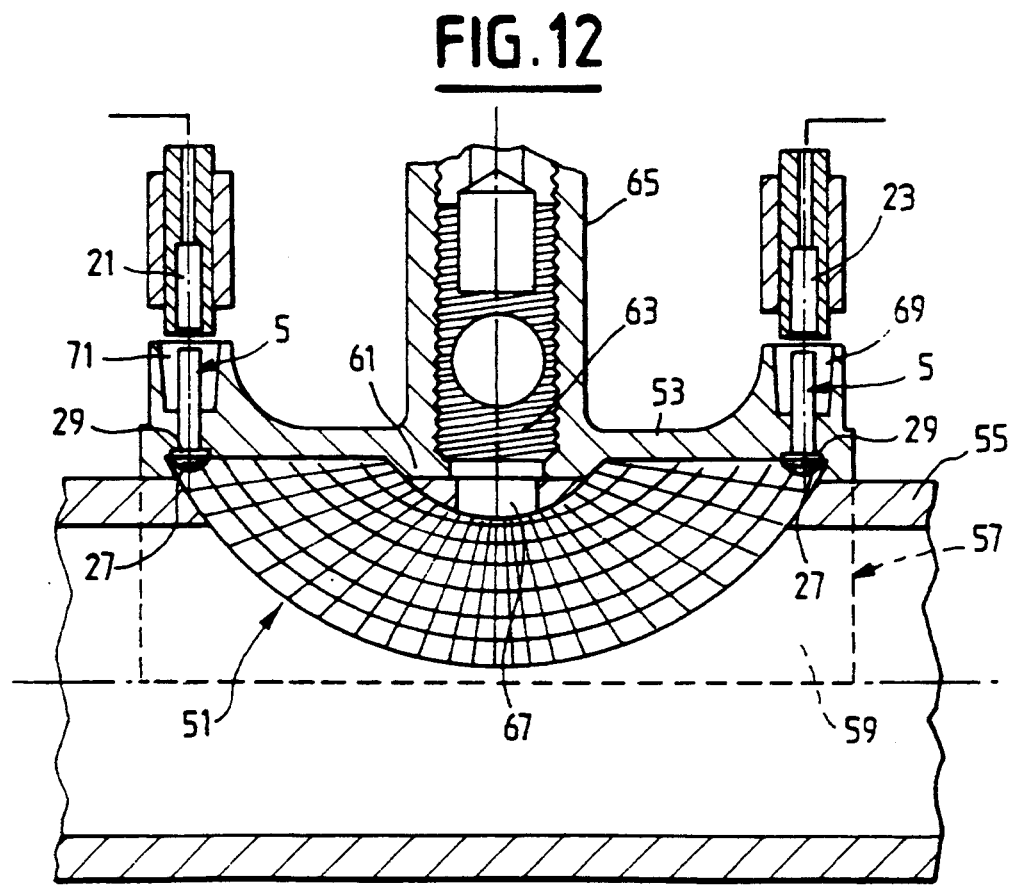
FIG. 12 is a central longitudinal sectional view of a T-connection saddle equipped with the net in the form of a rosette of FIG. 11, here represented in a cut-away view.

In this manner, there now only remains, fixed to the plate, a single electrically conducting body 5 whose cylindrical hollow shaft 5a will be able to be used as a pin for the connection to an associated socket, such as, for example, one of the two sockets 21, 23 illustrated in FIGS. 10 and 12.

FIG. 4 and the following figures illustrate the application of the connection terminal of the invention to the electrical connection of a conducting piece produced in the form of a cloth or of a meshed net.

Such a net used on an electro-weldable connecting piece is in particular described in the publication FR-A-2,654,978 (corresponding U.S. Pat. No. 5,141,580). For any complementary information concerning this net, it will be possible to refer to these publications which are introduced by reference in the present description.

Thus, FIG. 4 represents a net portion having interlaced sections, the net having the particular feature of being preferably produced from a single electrically conducting wire 21 (i.e. ensuring electrical continuity from one end to the other of the network).

The structure of this wire has been recalled in FIG. 5, from which it is possible to show that the said wire can in particular consist of a conducting cable 23 (for example made of copper) of a few tenths of a millimeter in diameter coated with a layer or with a film 25, for example based on polyesterimide, and electrically insulating at least up to a predetermined temperature (approximately 250° C.).

FIG. 4 shows the shank 3 inserted into the internal passage 11 of the body 5, in such a way that its head 9 emerges from the side of the section 5b which penetrates one of the meshes of the net. For good integrity of the assembly, two larger-diameter metal washers 27, 29 have been added, one above the net and the other beneath it.

After the riveting has been performed, the net or the corresponding meshed fabric will thus be encountered again, as shown in FIG. 6, held tightly between the two washers 27, 29 the flange 5'b holding it all tightly together, between it and the collar 13.

If the wire of the meshing used is of the type of that of FIG. 5, it will therefore be necessary to provide, on the rivet, rupture means for tearing, during the riveting, the skin 25 at the location of the placing of the rivet, so as thus to ensure the electrical contact.

These tearing means could, for example, consist of serrations made on the "upper" surface 13a (see FIG. 4) of the collar 13.

However, in this case, it has been preferred to use as the washer 29 a toothed washer which is to ensure the same effect. Thus, these tearing means extend around the mesh penetrated by the terminal, that is to say substantially perpendicular to the shaft 5, between the mesh in question and the collar 13, facing the flange 5'b (or indeed its side).

Let us now turn our attention to FIGS. 7 to 9, in order to describe briefly the use, on an electro-weldable plastic sleeve, of such a meshed net thus connected to the connection terminal 5 of FIG. 6, towards each of the opposite ends of its wire.

FIGS. 7 and 8 show the tubular shape, in the form of a cylinder of substantially circular cross-section, of the net 31 whose two opposite ends of the wire constituting it have been identified by 21a and 21b.

FIG. 9 illustrates diagrammatically the manner in which the "Ω"-shaped loops of the wire 21 are mutually interlaced in order to constitute the meshes of the net, which net is encountered again arranged inside the electro-weldable connecting sleeve 33 in FIG. 10.

Except for this resistance element in the form of a net 31, which is here arranged with its cylinder axis 31a substantially coincident with the axis 35 of the wide central cylindrical orifice 37 which penetrates right through the sleeve, the latter has, locally, on two opposite sides of its external perimeter, two cavities or wells 39, 41 which are open to the outside and, in this case, are substantially perpendicular to the axis 35. Into each of these cavities emerges the free end of one of the two shafts 5a of a connection terminal 5 in accordance with the invention. Of course, each terminal 5 has been riveted beforehand to the resistive net with interposition of the washer 27 and of the toothed washer 29.

Thus arranged, the two shafts 5a will be able to constitute two electrical connecting pins, which are connectable, if care has been taken to give them a suitable length and diameter, with two conventional connecting sockets, such as the sockets 21 and 23, which are themselves each connected to their conducting supply cable, respectively 43 and 45.

FIG. 10 also shows the two thermoweldable plastic pipes 47, 49 intended to be joined together via the sleeve 33. In this case, these pipes have been arranged coaxially so that their two ends facing each other are inserted quite tightly inside the orifice 37 of the sleeve.

Let us now turn our attention to FIGS. 11 and 12 in order to show another application of the invention.

First of all, it will be possible to notice in FIG. 11 that the shape of the conducting net, referenced in this case by 51, is in the form of a flattened ring.

Such a "resistive ring" can especially be of the type of that described in French Patent Application FR-A-92/04415 filed by the present Applicant on Apr. 10, 1992. In other words, the component 51 can be produced from the meshed cylindrical structure of FIGS. 7 and 8 from which a section will have been cut, which section will have been squashed on itself and flattened so as to constitute a double-thickness circular ring.

It is this ring 51 having a single resistive wire which is encountered again in FIG. 12.

This figure more generally shows an electroweldable branch connector 53 for the transverse connecting of a pipe 55 with another pipe (not shown).

In this case, the piece 53 whose body is produced from a heat-meltable plastic (such as polyethylene), as was the body of the sleeve 33, has a part 57 in the form of a saddle with an internal surface 59 forming a cylinder part of semicircular cross-section, so as to be able to straddle substantially coaxially the pipe 55.

In the vicinity of this internal surface 59, and embedded in its plastic body, the piece 53 encloses the resistive ring 51 which has, of course, a curvature corresponding substantially to that of the saddle 57, the central orifice 61 of this resistive element 51 surrounding, at some distance, the passage 63 of the shaft 65, which stands up substantially half way along the branch connector, perpendicular to the axis of the pipe 55. In practice, and as is known per se, the passage 63 is intended to be prolonged by a coaxial orifice 67 enabling the pipe 55 to communicate transversely with another pipe which will be installed and correctly connected to the projecting shaft 65.

As before, and substantially in the region of the two ends of its constituent wire, the resistive ring 51 is connected to the then-riveted connection terminals 5 preferably with their washers 27, 29.

As in FIG. 10, the two terminals 5 stand up in order to emerge into two transverse external wells 69, 71, each being thus connectable to the removable sockets 21, 23.

In practice, the manufacture of the two pieces 33, 53 will be easy to implement. In order to do this, it will suffice, after having chosen the most suitable resistance element (such as the resistive cylinder 31 for the sleeve 33 and the resistive ring 51 for the transverse T-connection connector 53), to fix the two connection terminals 5 by riveting, taking care to arrange them at the two locations making it possible to ensure a current flow such that it runs, from one of the terminals, at least into most of the said resistance element, before reaching the second terminal.

Once this crimping operation has been completed, the resistance element will then be placed, with its terminals, in a moulding machine, known per se, and onto these terminals will be overmoulded, by injection, the plastic body of the connecting piece. During this operation, the wells 39, 41 or 69, 71 will be produced with, penetrating through them, the shafts 5a (of cross-section markedly smaller than that of the said wells).

It will then suffice to allow the piece to cool until it is completely solidified.

We claim:

1. A connecting device for connecting two pipes therebetween, said pipes being at least partly made of a heat-weldable thermoplastic material, said connecting device comprising:
    a moldable body made of a heat-weldable thermoplastic material including a resistive element and connection terminals electrically connected to said resistive element;
    said resistive element having a mesh structure comprising an electrical wire for heating said thermoplastic material of the body and welding it with the thermoplastic material of the pipes;
    said resistive element being embedded in the thermoplastic material of said device body;
    said connection terminals each being riveted through the mesh of said resistive element, and each terminal being partially embedded and molded within the thermoplastic material of said device body and extending therethrough so as to emerge outwardly on an outer surface thereof; and
    wherein each of said terminals includes a tubular rivet body made of an electrically conductive material so as to be an electrical connector, said tubular rivet body including a collar integrally formed with a hollow shaft and a flanged portion bent over said collar for immobilizing said resistive element between said collar and flanged portion.

2. A connecting device according to claim 1, wherein:
    the wire of said resistive element is coated with an electrically insulating film; and
    each of said terminals comprises rupture means for tearing said electrical insulating film of the wire upon riveting of the rivet body, thus ensuring an electrical contact with said wire, said rupture means being disposed between said flanged part and said collar and extending around said mesh through which the corresponding connection terminal is engaged.

3. A connecting device according to claim 2, wherein each connection terminal is provided with at least two electrically conducting washers having an external cross-section greater than that of the mesh size of the resistive element, said washers being arranged on either side of the resistive element, respectively, with at least one of said washers having tearing elements thereon for tearing said electrically insulating wire film.

4. A connecting device according to claim 1, wherein said device body is overmolded onto each tubular rivet body of said connection terminals and onto said resistive element.

5. A connecting device for connecting two pipes therebetween, said pipes being at least partly made of a heat-weldable thermoplastic material, said device comprising:
    a body made of a heat-weldable thermoplastic material including a resistive element and connection terminals electrically connected to said resistive element;
    said resistive element having a mesh structure comprising an electrical wire coated with an electrically insulating film for heating said thermoplastic material of the body and welding it with the thermoplastic material of the pipes;
    said connection terminals each being riveted through the mesh of said resistive element and extending through said device body so as to emerge outwardly on an outer surface thereof;

wherein each of said terminals comprises:

a tubular rivet body made of an electrically conductive material so as to be an electrical connector, said tubular rivet body including a collar integrally formed with a hollow shaft and a flanged part bent over said collar for immobilizing said resistive element therebetween; and rupture means for tearing said electrical insulating film of the wire upon riveting of the rivet body so as to ensure an electrical contact with said wire, said rupture means being disposed between said flanged part and said collar and extending around said mesh through which the corresponding connection terminal is engaged.

6. A connecting device according to claim 5, wherein each connection terminal is provided with at least two electrically conducting washers having an external cross-section greater than that of the mesh size of the resistive element, said washers being arranged on either side of the resistive element, respectively, with at least one of said washers having tearing elements thereon for tearing said electrically insulating wire film.

7. A connecting device according to claim 5, wherein said device body is molded over said tubular rivet body, the hollow shaft of the rivet body emerging outwardly on the outer surface of said device body through an opened cavity formed therein, said opened cavity having a cross-section greater than that of said hollow shaft which defines an electrical connection pin.

8. A connecting device according to claim 5, wherein said device body is overmolded onto each tubular rivet body of said connection terminals and onto said resistive element.

9. A connecting device according to claim 5, wherein said device body is an electro-weldable sleeve having an orifice therethrough, around which said resistive element is disposed for receiving coaxially therein the pipes to be connected.

10. A connecting device according to claim 5, defining an electro-weldable branch connector for a transverse connection of said pipes therebetween, said device body having a substantially cylindrical internal surface around which said resistive element is arranged and which extends transversely to a connection shaft having a passage therethrough, said connection shaft projecting externally from said device body.

* * * * *